S. I. FEKETE.
SPRING SHACKLE BOLT FOR AUTOMOBILES.
APPLICATION FILED FEB. 23, 1918.
1,287,936.
Patented Dec. 17, 1918.
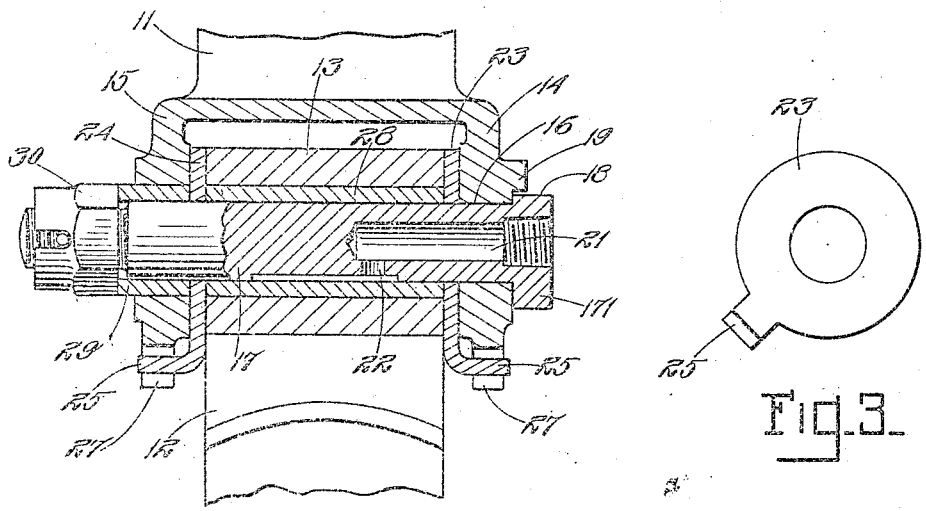
Fig. 2.
Fig. 3.
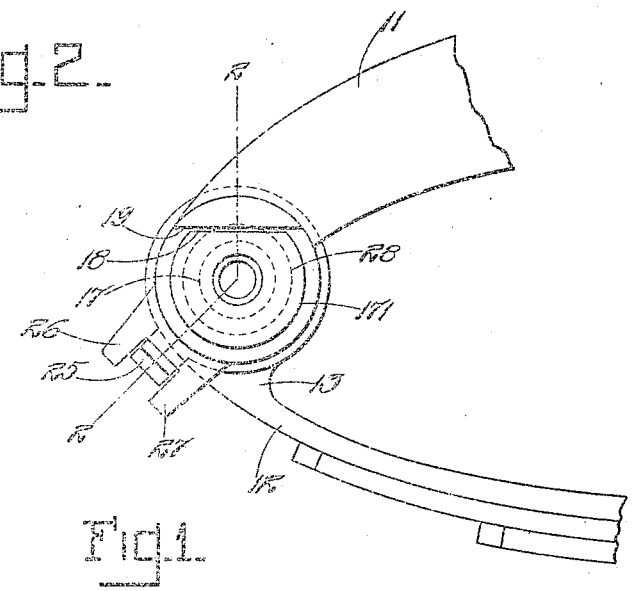
Fig. 1.
INVENTOR
Stephen Ivan Fekete
by Macleod, Calver, Copeland & Dike
Attys

UNITED STATES PATENT OFFICE.

STEPHEN IVAN FEKETE, OF DETROIT, MICHIGAN, ASSIGNOR TO ESSEX MOTORS, OF DETROIT, MICHIGAN, A CORPORATION OF MICHIGAN.

SPRING SHACKLE-BOLT FOR AUTOMOBILES.

1,287,936.  Specification of Letters Patent.  Patented Dec. 17, 1918.

Application filed February 23, 1918. Serial No. 218,655.

*To all whom it may concern:*

Be it known that I, STEPHEN I. FEKETE, a subject of King of Hungary, residing at Detroit, county of Wayne, State of Michigan, have invented a certain new and useful Improvement in Spring Shackle-Bolts for Automobiles, of which the following is a specification, reference being had therein to the accompanying drawings.

My invention has for its object a new and improved bolt construction for use to connect the ends of the springs with the frame of an automobile where semi-elliptical springs are used or to connect the springs to each other where three-quarter or full elliptical springs are used. The particular object of the invention is to provide a device of the character mentioned which will wear better and give less trouble to the user than the devices heretofore commonly employed. Another object is to provide a construction in which the parts will remain quiet longer and the bolt will not tend to creep longitudinally.

The invention will be fully understood from the following description when taken in connection with the accompanying drawings and the novel features thereof will be pointed out and clearly defined in the claims at the close of this specification.

In the drawings, Figure 1 is a side elevation of a shackle bolt together with the end of the horn and the end of the spring with which the shackle bolt is employed.

Fig. 2 is a section on line 2—2 of Fig. 1.

Fig. 3 is a plan of one of the washers.

Referring now to the drawings, at 11 is shown the end of one of the horns of the frame or other member to which the spring is to be connected. It will be understood of course that this may be another spring in case the shackle construction is used with a full elliptical or three-quarter elliptical spring. At 12 is shown the end of the spring. The spring has the usual eye 13. The end of the horn is forked as shown at 14 and 15 and on one side is drilled with a hole 16 of a size to receive the shackle bolt 17. The shackle bolt has a head 171 which is slabbed off as shown at 18 to fit under a projection 19 on the horn. This keeps the bolt 17 from turning. The bolt is drilled out as shown to form a grease passage 21, 22 and for the reception of a grease cup (not shown). The projections 14 and 15 on the horn 11 are spaced apart sufficiently to permit the introduction of washers 23 and 24 between the sides of the spring and inner faces of the projections 14 and 15 on the horn. These washers 23 and 24 (see Fig. 3) are each provided with a tang 25 bent at right angles to the plane of the washer and adapted to extend between a pair of lugs 26 and 27 on the lower end of the projections 14 and 15 on the horn 11. These tangs hold the washers 23 and 24 stationary. It will, therefore, be seen that neither the washers nor the bolt turn relatively to the frame.

At 28 is shown a hardened steel bushing of a length equal to the width of the spring 12 and received within the eye in the spring. At 29 is shown another hardened steel bushing which extends from the washer 24 toward the nut 30 which is threaded on to the end of the bolt 17. The bushing 29 is long enough so that the nut 30 forces the bushing 29 against the washer 24. Since neither the bolt 17 nor the washer 24 can move relatively to the frame the bushing 29 will also remain stationary.

It will be seen that no wear whatsoever comes on any part of the horn 11. All the wear comes between the bushing 28 and the bolt 17 and between the faces of the washers 23 and 24 which faces contact with the spring 12 and bushing 28. Since the washers 23 and 24, bolt 17 and bushing 28 are any or all of them renewable quickly and easily and with a minimum of expense, it is possible to keep the connection between the end of the spring and the horn in proper condition with the least possible expenditure of time and trouble. It is found in practice that the construction described herein remains in good condition for a relatively long time and with the least possible care. It will also be seen that since the bolt 17 is held from longitudinal movement by its head 171, bushing 29 and nut 30, and the washer 24 the tendency of the bolt to creep lengthwise is practically eliminated.

What I claim is:

1. In combination with a spring having an eye and a member to which the spring is to be connected, said member having downward projections with holes therein for the reception of a bolt, a round shackle bolt passing through said holes and the eye in the spring, said bolt being prevented from rotating relatively to one of said members, and washers interposed between the spring and the adjacent sides of the member, said washers being provided with tangs which engage the member and prevent the washers rotating relatively to the member.

2. In combination with a spring having an eye and a member to which the spring is to be connected, said member having downward projections with holes therein for the reception of a bolt, a shackle bolt passing through the holes and the eye in the spring, said bolt being prevented from rotating relatively to one of said members, washers interposed between the spring and the adjacent sides of the member, said washers being prevented from rotation relatively to the member, a bushing within the eye of the spring and of a length equal to the width of the spring, a second bushing on the said bolt located between one of said washers and the end of the bolt, and a nut on said bolt forcing the second bushing against the said washer.

3. In combination with a spring having an eye and a member to which the spring is to be connected, said member having downward projections with holes therein for the reception of a bolt, a shackle bolt passing through the holes in the member and the eye in the spring, said bolt having a non-circular head contacting with an adjacent projection on the said member, washers with tangs engaging the said member and being held from rotation thereby, a bushing within the eye of the spring and of a length equal to the width of the spring, its ends resting against said washers, a second bushing on said bolt located between one of said washers and the end of the bolt, and a nut on said bolt forcing the second bushing against the said washer.

In testimony whereof I affix my signature.

STEPHEN IVAN FEKETE.